United States Patent
Yang

(10) Patent No.: US 12,437,146 B2
(45) Date of Patent: Oct. 7, 2025

(54) STORAGE FORMAT FOR CHINESE LANGUAGE AND RELATED PROCESSING METHOD AND APPARATUS

(71) Applicant: Mingwei Yang, West Covina, CA (US)

(72) Inventor: Mingwei Yang, West Covina, CA (US)

( * ) Notice: Subject to any disclaimer, the term of this patent is extended or adjusted under 35 U.S.C. 154(b) by 190 days.

(21) Appl. No.: 18/403,704

(22) Filed: Jan. 3, 2024

(65) Prior Publication Data

US 2025/0217574 A1     Jul. 3, 2025

(51) Int. Cl.
    *G06F 40/129*      (2020.01)
    *G06F 40/126*      (2020.01)
    *G06F 40/53*      (2020.01)

(52) U.S. Cl.
    CPC .......... *G06F 40/129* (2020.01); *G06F 40/126* (2020.01); *G06F 40/53* (2020.01)

(58) Field of Classification Search
    CPC ....... G06F 40/129; G06F 40/126; G06F 40/53
    See application file for complete search history.

(56) References Cited

U.S. PATENT DOCUMENTS

| | | | | |
|---|---|---|---|---|
| 7,043,430 B1 * | 5/2006 | Chung | .................... | G10L 15/02 704/251 |
| 7,181,391 B1 * | 2/2007 | Jia | ........................... | G10L 15/18 704/251 |
| 2008/0120108 A1 * | 5/2008 | Soong | .................... | G10L 15/18 382/187 |

* cited by examiner

*Primary Examiner* — Darioush Agahi
(74) *Attorney, Agent, or Firm* — Chen Yoshimura LLP

(57) ABSTRACT

A storage format of Chinese language ("Readable Hanyu Expression" or "RHE") and the related processing methods and systems. Unlike current Chinese processing methods which directly code Chinese characters into fonts for display, RHE takes an indirect approach by storing Chinese language in the RHE storage format that can be mapped to several display forms including simplified and traditional Chinese characters, Hanyu Pinyin, etc. In the RHE storage format, each Chinese word is stored as an RHE storage element having the format $(Syllable+Tone)_n+Mark$, where n is the number of syllables (Chinese characters) in the word, Syllable represents the pronunciation (without the tone) of the character, Tone represents the tone of the pronunciation, and Mark is a value that differentiates different words having the same pronunciations and tones. Various mapping tables are used to map RHE storage elements to standard Chinese character codes (such as Unicode) and Pinyin expressions.

32 Claims, 15 Drawing Sheets

| | |
|---|---|
| a0 | a |
| a1 | ā |
| a2 | á |
| a3 | ǎ |
| a4 | à |
| ai1 | āi |
| ai2 | ái |
| ai3 | ǎi |
| ai4 | ài |
| an1 | ān |
| an3 | ǎn |
| an4 | àn |
| ang1 | āng |
| ang2 | áng |
| ang4 | àng |
| ... | ... |
| eei1 | ē̍ |
| eei2 | ế |
| eei3 | ě̍ |
| eei4 | ề |
| ng2 | ńg |
| ng3 | ňg |
| ng4 | ǹg |
| mi1 | mī |
| mi2 | mí |
| mi3 | mǐ |
| mi4 | mì |
| n2 | ń |
| nv3 | nǚ |
| nv4 | nǜ |

FIG. 2

| | | | |
|---|---|---|---|
| a0001 | 阿 | 阿 | |
| a0002 | 呵 | 呵 | |
| a0003 | 啊 | 啊 | |
| a1001 | 吖 | 吖 | |
| a1002 | 阿 | 阿 | |
| a1003 | 呵 | 呵 | |
| a1004 | 啊 | 啊 | |
| a1005 | 锕 | 錒 | |
| a1006 | 腌 | 腌 | |
| a2001 | 呵 | 呵 | |
| a2002 | 啊 | 啊 | |
| a2003 | 嘎 | 嘎 | |
| a3001 | 呵 | 呵 | |
| a3002 | 啊 | 啊 | |
| a4001 | 呵 | 呵 | |
| a4002 | 啊 | 啊 | |
| ai1001 | 哎 | 哎 | |
| ai1002 | 哀 | 哀 | |
| ai1003 | 埃 | 埃 | |
| ai1004 | 挨 | 挨 | |
| ... | ... | ... | |

FIG. 3

| chuang4kan1hao4001 | 创刊号 | 創刊號 | 400110014001 |
|---|---|---|---|
| chuang4li4001 | 创立 | 創立 | 40014005 |
| chuang4li4002 | 创利 | 創利 | 40014014 |
| chuang4pai2zi0001 | 创牌子 | 創牌子 | 400120053001 |
| chuang4ran2001 | 怆然 | 愴然 | 40032002 |
| chuang4she4001 | 创设 | 創設 | 40014002 |
| chuang4shi3001 | 创始 | 創始 | 40013006 |
| chuang4shou1001 | 创收 | 創收 | 40011001 |

| xin1yi4001 | 心意 | 心意 | 10014063 |
|---|---|---|---|
| xin1yi4002 | 新义 | 新義 | 10134005 |
| xin1yi4003 | 新异 | 新異 | 10134015 |
| xin1yi4004 | 新意 | 新意 | 10134063 |

STORAGE FORMAT FOR CHINESE LANGUAGE AND RELATED PROCESSING METHOD AND APPARATUS

BACKGROUND OF THE INVENTION

This invention relates to Chinese language processing by computers, and in particular, it relates to a storage format for Chinese language and related data processing method and apparatus for displaying or printing the Chinese language in different forms.

The current written form of Chinese language is formed of Chinese characters, which are logograms. There are more than fifty thousand Chinese characters, although only a few thousands are commonly used. Each Chinese character has a monosyllable pronunciation (including a tone), but the shape of the character itself typically does not represent its pronunciation (thus, the ability to pronounce a Chinese character is primarily based on memorization). Most Chinese characters have a single pronunciation, but some have more than one. It is also common for multiple Chinese characters to have the same pronunciation. One or more Chinese characters may form a monosyllable or polysyllable word.

In addition, there exist two sets (versions) of Chinese characters: the simplified characters and the traditional characters. In most instances, the simplified character and the traditional character are identical; in some instances, the simplified character and the traditional character have a one-to-one correspondence; in other instances, one simplified character corresponds to multiple traditional characters having the same pronunciation (i.e., multiple different traditional characters of the same pronunciation were simplified into one simplified character of that pronunciation).

Chinese language processing in computers, which started as early as the early 1970's, is widely and deeply applied everywhere the Chinese-speaking parts as well as elsewhere of the world and has become indispensable part of life for a large segment of the world's population.

In early computer systems, computers could only recognize and process English and other western European languages, and could not recognize Chinese or other languages. They were completely based on the English environment, which means that computers could only process numbers, letters, and some symbols used in English. All characters (numbers, letters, and symbols) were ultimately encoded into computer codes that can be recognized by computers, known as internal codes. All characters were transformed into a computer code table called ASCII code. Symbols outside this set, especially the huge number of character symbols such as Chinese characters, could not be recognized by computers.

In order to solve the problem of how computers display Chinese characters, it is necessary to encode Chinese characters so that they can be displayed on the computer. The GB2312 code was the first national standard (in People's Republic of China) for Chinese character coding, with an extended GB 18030 code released later. GB code is also a computer internal code; it uses the same encoding principle as ASCII, i.e., by encoding each Chinese character with a two-byte code, while the corresponding glyphs (graphical shape) libraries—called fonts—are also developed for purposes of display. During keyboard input, if the English input method or the default input method is turned on, the computer automatically searches for the ASCII code table; if the Chinese character input is turned on, the computer automatically searches for the GB code. After finding the code, the display principle is the same for ASCII or GB—i.e., each encoded character is displayed as a glyph.

Other Chinese character coding systems are used in other Chinese-speaking regions such as Hong Kong and Taiwan, such as BIG5, etc. These various character coding systems are defined for the same language (Chinese) but their coding values are deferent; all are based on similar coding principles as ASCII as described above.

In the late 1980's, Unicode emerged as the result of international efforts to include all major language's written symbols in a unified coding system. The Chinese language, as an important language, has been allotted more than 20,000 symbols in the basic set of Unicode. In more recent Unicode versions (now Unicode 14), the Chinese language has been given more coding positions (more than 80,000) in Unicode's extensions. GB and BIG5 may still be used, but for the most part, they have been replaced by Unicode.

Hanyu Pinyin (or simply Pinyin) is a standard Romanization system that represents the pronunciation of Chinese characters. It is commonly used to aid in reading and learning Chinese characters, to translate names of people and places, for keyboard input of Chinese characters, etc.

Note that in this disclosure, the term "Chinese language" refers to the language used by the ethnic Han Chinese, although other ethnic groups in China use other languages. Further, the pronunciation refers to that of the official Chinese language, sometimes known as "Mandarin", rather than those of the regional dialects used in various regions of China.

SUMMARY OF THE INVENTION

Due to the unique characteristics of the Chinese language outlined above, existing Chinese language processing techniques have some fundamental shortcomings. First, the code corresponds to Chinese characters, but as mentioned earlier, the characters do not represent their pronunciation. Thus, the coding does not help the reader read the character. So if one encounters a rare character that he has not memorized, he simply cannot pronounce it.

Second, as mentioned earlier, there exist two sets of Chinese characters, simplified and traditional. Thus, a same language unit (character) may have two codes (thus two fonts) in Unicode. Conversion between the two sets may have errors because the code mapping between them is sometimes not one to one.

Third, as mentioned earlier, many Chinese characters have multiple pronunciations, and the correct pronunciation depends on context. Even some multi-character words can have multiple pronunciations.

These problems stem from the essence of the Chinese language. However, if Chinese language processing continues to mimic the processing of Western languages, the problems will persist in computer systems. The existing Chinese language processing systems cannot solve these problems.

Accordingly, an object of the present invention is to provide a different way of Chinese language processing that makes the stored data more readable (i.e., to indicate the pronunciation of the characters) and more accurate.

Embodiments of the present invention provide a Chinese language storage format, referred to herein as Readable Hanyu Expression (RHE) for convenience ("Hanyu" means Chinese language), which defines rules to make it a storage format that can be used to replace existing Chinese text storage methods. RHE storage format does not replace existing Chinese character coding methods such as Unicode, nor existing keyboard input methods for Chinese language, but rather, it works with existing character coding and keyboard input methods to make Chinese text storage and display more convenient, and to make it easier to display the text in different forms including simplified and traditional characters, Pinyin, etc. (Here, "display" is used to include displaying on a screen and printing a hard copy.)

The RHE format text data, as a storage form, may also facilitate various processing of Chinese text, such as indexing, sorting, etc.

The RHE storage format represents each word of the Chinese language, either a single-syllable word (i.e., single-character word, referred to as SSW herein for convenience) or a multi-syllable word (i.e., multi-character word, referred to as MSW herein for convenience), as an RHE element in the format of:

(Syllable+Tone)$_n$+Mark, where n is the number of syllables in the word and n=1, 2, 3, . . . . Syllable is represented by a Romanization of the pronunciation (without the tone) of the syllable, for example, using the existing Pinyin representation. Tone is a single digit numerical value representing the tone of the character. Mark is a three-digit value used to differentiate different Chinese characters of the sane pronunciation. Alternatively, a four-digit or longer number may be used, but a three-digit number is generally sufficient. (In this disclosure, the words Syllable, Tone and Mark in italics denote the parts of the RHE element.)

Embodiments of the present invention also provide three RHE mapping tables: The Syllable with Tone table, the Single-Syllable Word (SSWs) table, and the Multi-Syllable Word (MSWs) table. These tables define not only the basic RHE elements, but also the mappings between RHE elements to simplified Chinese characters, traditional Chinese characters, and Pinyin.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a method implemented in a computer system for processing Chinese language, the method including: receiving an input Chinese language text including a plurality of Chinese words; generating a plurality of storage elements by mapping each of the plurality of words into a storage element, wherein the storage element for each word includes a first part, Syllable, which represents a pronunciation of a syllable of the word without a tone, a second part, Tone, which represents a tone of the pronunciation of the syllable, and a third part, Mark, which uniquely identifies the word among multiple words of identical pronunciations and tones; and storing the storage elements in the computer system.

In another aspect, the present invention provides a computer program product including a computer usable non-transitory storage medium (e.g. memory or storage device) having a computer readable program code embedded therein for controlling a data processing apparatus, the computer readable program code configured to cause the data processing apparatus to execute the above methods.

It is to be understood that both the foregoing general description and the following detailed description are exemplary and explanatory and are intended to provide further explanation of the invention as claimed.

BRIEF DESCRIPTION OF DRAWINGS

A more complete application of this architecture, and many of the attendant advantages thereof, will be readily apparent as the same becomes better understood by reference to the following detailed description when considered in conjunction with the accompanying drawings in which like reference symbols indicate the same or similar components, wherein:

FIG. 2 shows an exemplary part of a syllable with tone table of the Chinese language storage and processing system.

FIG. 3 shows an exemplary part of a single-syllable word (SSW) table of the Chinese language storage and processing system.

FIGS. 4A and 4B show exemplary parts of a multi-syllable word (MSWs) table of the Chinese language storage and processing system.

DETAILED DESCRIPTION OF THE INVENTION

System Overview

Figure 1:
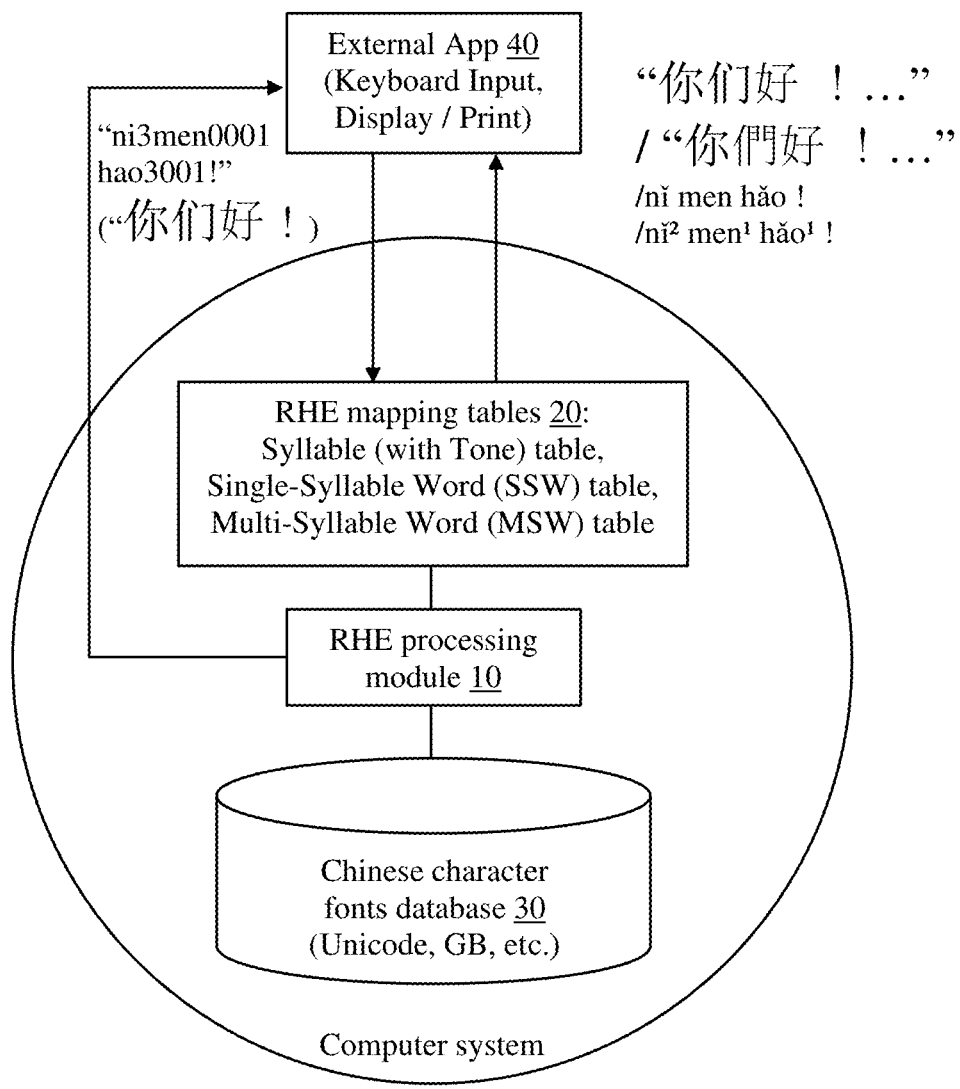
FIG. 1 shows the overall structure of a Chinese language storage and processing system according to embodiments of the present invention.

FIG. 1 shows the overall structure of a computer-implemented Chinese language storage and processing system according to embodiments of the present invention. The storage and processing system provides a processing layer (processing module 10 and mapping tables 20) between external applications 40 and a Chinese character coding database 30 (which may be an existing encoding database such as Unicode, GB, BIG5, etc.), thus changing direct processing into an indirect one. The processing layer and related data storage format are referred to herein as Readable Hanyu Expression (RHE) for convenience. As illustrated in FIG. 1, the RHE processing layer cooperates with external applications 40 (including their keyboard input methods) and the Chinese character coding database 30 to accomplish Chinese language processing, storage, and display.

RHE storage format uses a set of 36 ASCII symbols: the 26 letters of the English alphabet, and the 10 numerical characters 0 to 9. Each Chinese word in a text, either a single-syllable or a multi-syllable word, is mapped to an RHE element which is an alphanumeric string formed of these 36 ASCII symbols. The text is stored in the form of these RHE elements.

Single-Syllable Words

A single-syllable word (SSW), i.e., a single Chinese character, is expressed by the following storage element, referred to as an RHE SSW element formed of three ordered parts:

Syllable+Tone+Mark where Syllable is a string of one or more letters that represents the pronunciation of the syllable without the tone (the length of Syllable is not fixed); Tone is a single digit numerical value between 0 and 4 (values of 5 to 9 may be used for other processing purposes) that represents the tone of the character; and Mark is a three-digit value used to differentiate different Chinese characters having the same pronunciation. (In this disclosure, the terms Syllable, Tone and Mark in italics denote the parts of the RHE elements. Also note that the "+" symbol in the above expression is not an actual symbol in the storage element, but merely used to depict the format of the storage element.)

Syllable preferably uses the Pinyin representation. In Pinyin, the tones of the Chinese character may be represented using diacritics and/or using tone numbers, namely 1, 2, 3, 4 for the first, second, third and fourth tones, and 0 (or no number) for the soft tone (also called the neutral tone). In the above RHE SSW element, Syllable is expressed by Pinyin without the tone (i.e. using the letters of the English alphabet without diacritics), and Tone (with values between 0 and 4) represents the tone of the character. It should be noted that while it is convenient to use the numbers 0 to 4 to represent Tone, other ways of representing Tone may be used, such as other numbers, other symbols, etc.

Note that the Pinyin system uses a letter "ü" which is not in the English alphabet. In RHE (as is in some variations of Pinyin), "ü" is replaced by the letter "v" which is not otherwise used in Pinyin to represent any sound.

FIG. 2 shows an exemplary portion of the RHE Syllable with Tone table, where the first column contains the Syllable with Tone according to the RHE storage format, and the second column contains the corresponding Pinyin (with tone) expression of the syllable, with the tone represented by diacritics. In one example, the RHE Syllable with Tone table contains 1338 syllable with tone entries.

In the above RHE SSW element, Mark is a three-digit number, ranging from 001 to 999, used to differentiate different Chinese characters having the same Syllable+Tone. Thus, each unique Chinese character is uniquely represented by an RHE SSW element. The particular assignment of Mark values to the different characters is not important. In one embodiment, the Mark values are sorted based on the stroke numbers of the characters (the number of strokes each character is composed of). The Mark value may also be based on the order in which these characters are collected in a particular dictionary. Mark may alternatively be a two- or four-digit number or numbers of other lengths.

For example, the RHE element "wang2002" corresponds to the simplified Chinese character "王" (as the word for king), the traditional Chinese character "王" (as the word for king), and the Pinyin representation "wáng".

The RHE elements for single-syllable words (single Chinese characters) are collected in a single-syllable word (SSW) table of the RHE storage and processing system, an exemplary portion of which is shown in FIG. 3. The first column of the SSW table contains the RHE element in the format of Syllable+Tone+Mark, and the second and third columns contain the corresponding simplified and traditional Chinese characters, respectively, which are encoded using a standard Chinese character coding system, such as Unicode, GB, BIG5, etc.

As noted above, each SSW is a basic unit in the Chinese language, having definite meanings; its display in written form may be the same or different for the simplified and traditional versions of Chinese characters. The RHE SSW element for each character is unique, but can be mapped to both the simplified and traditional Chinese characters. For example, the RHE element yang2002 corresponds to simplified and traditional Chinese characters "羊" and "羊" respectively while the RHE element yang2005 corresponds to simplified and traditional Chinese characters "杨" and "楊" respectively. Both RHE elements correspond to Pinyin "yáng", as shown in Table 1.

TABLE 1

| RHE SSW element | Pinyin | Simplified Chinese character | Traditional Chinese character |
| --- | --- | --- | --- |
| yang2002 | yáng | 羊 | 羊 |
| yang2005 | yáng | 杨 | 楊 |

For a Chinese character that has multiple pronunciations, multiple RHE SSW elements are defined for it, one for each pronunciation. An example is show in Table 2:

TABLE 2

| RHE SSW element | Pinyin | Simplified Chinese character | Traditional Chinese character |
| --- | --- | --- | --- |
| hang2002 | háng | 行 | 行 |
| hang4001 | hàng | 行 | 行 |
| xing2003 | xíng | 行 | 行 |

In cases where a simplified Chinese character corresponds to more than one traditional Chinese character, RHE defines multiple SSW elements respectively corresponding to the multiple traditional characters. Some examples are shown in Table 3:

TABLE 3

| RHE SSW element | Pinyin | Simplified Chinese character | Traditional Chinese character |
| --- | --- | --- | --- |
| feng1002 | fēng | 丰 | 豐 |
| feng1003 | fēng | 丰 | 丰 |
| jiang1004 | jiāng | 姜 | 薑 |
| jiang1005 | jiāng | 姜 | 姜 |
| yun2002 | yún | 云 | 云 |
| yun2003 | yún | 云 | 雲 |

Example 1—Text Stored Using SSW Elements

Using the SSW storage format, the following example is the poem "Spring Dawn" (春晓) by the Tang Dynasty poet Meng Haoran (689-740):

(In spring slumber, I'm unaware of the dawn,
Everywhere, I hear the singing of birds at morn.
Throughout the night, sounds of wind and rain,
How many blossoms have fallen, it's hard to ascertain?)

Its RHE format using the single-syllable word representation is:

meng4001 hao4005 ran2002 chun1002 xiao 1005
chun1002 mian2001 bu4001 jue2011 xiao3002,
chu4002 chu4002 wen2007 ti2004 niao3001.
ye4006 lai2001 feng 1003 yu3007 sheng 1003,
hua1002 luo4010 zhi1011 duo1001 shao3001?

The corresponding display in simplified Chinese characters is:

孟浩然春晓

春眠不觉晓, 处处闻啼鸟. 夜来风雨声, 花落知多少?

The corresponding display in traditional Chinese characters is:

孟浩然春曉

春眠不覺曉， 處處聞啼鳥. 夜來風雨聲，
花落知多少？

The corresponding display in Hanyu Pinyin is:

Mèn ghào rán chūn xiǎo

Chūn mían bù jué xiǎo, chù chù wén tí niǎo. Yè lái feng yǔsheng, huā luò zhīduō shǎo?

In some embodiments of the present invention, the same text may also be displayed in a Pinyin+Mark representation (in this displayed form, the mark is the RHE mark element displayed as a superscript after Pinyin):

mèng[1] hào[5] rán[2] chūn[2] xiǎo[2]

chūn[2] mían[1] bù[1] jué[11] xiǎo[2], chù[2] chù[2]wén[7] tí[4] niǎo[1]. yè[6] lái[1] fēng[3] yǔ[7] shēng[3], huā[2] luò[1] zhī[11] duō[1] shǎo[1]?

Multi-Syllable Words

A multi-syllable word (MSW), formed of multiple Chinese characters, is expressed by the following storage element, referred to as an RHE MSW element:

Syllable$_1$+Tone$_1$+Syllable$_2$+Tone$_2$+ . . . +Syllable$_n$+Tone$_n$+Mark where n≥2 is the number of syllables in the word.

In this element, the Syllable+Tone pair for each of the multiple syllables is defined the same way as the Syllable+Tone pair for a single-syllable word in the SSW element described earlier, and is an entry in the RHE Syllable with Tone table. Mark is a three-digit number, ranging from 001 to 999, used to differentiate different multi-syllable words that have the same syllables with the same tones.

The RHE elements for multi-syllable words are collected in a multi-syllable word (MSW) table of the RHE storage and processing system, two exemplary portions of which are shown in FIGS. 4A and 4B. In the MSW table, the first column contains the RHE MSW element; the second and third columns contain the corresponding simplified and traditional versions of the multiple characters, respectively, which are encoded using a standard Chinese character coding system, such as Unicode, GB, BIG5, etc.

For example, the RHE element "fa1dian4002" corresponds to simplified Chinese characters "发电" (as the word for Power Generation), traditional Chinese characters "發 電" (as the word for Power Generation), and the Pinyin representation "fādiàn".

The first column in FIG. 4B also shows that even though the Syllables and Tones of some words are exactly the same, they are still different words with different meanings, such as "心意" and "新意" (the Syllable and Tone pairs are both xin1yi4). The Marks (001 and 004) can distinguish them.

The fourth column in the MSW table contains a numeric string formed by concatenating the Tone's and Mark's of the RHE SSW elements for the multiple Chinese characters. This column can be used to indicate the relationship between the Chinese characters in the MSW table and the SSW table, i.e., the fact that each individual syllable of a multi-syllable word in the MSW table is an established single-syllable word in the SSW table. It is noted that either the fourth column alone without the second and third columns, or the second and third columns without the fourth column, is sufficient to identify the Chinese characters (e.g. in Unicode) of the multi-syllable word. Using the fourth column alone, each individual syllable of the MSW can be mapped to the corresponding single-syllable word in the SSW table and its standard character code (e.g. Unicode) can be obtained. Thus, either the fourth column, or the second and third columns, can be omitted from the MSW table, but including all of these columns helps to make the RHE processing more convenient and faster. It should also be noted that when any adjustments (corrections or updates) are made to the SSW table, the second and third columns of the MSW table should be adjusted accordingly to maintain consistency of the data between the SSW and MSW tables.

It is noted that while the SSW table should store as many single syllable words as possible, the size of the MSW table is much more flexible, and its content may evolve with time. In fact, multi-syllable word elements are not strictly necessary for the RHE storage format and processing, i.e., any Chinese written text can be stored using only RHE single-syllable word elements. Nevertheless, the use of multi-syllable word elements is advantageous because multi-syllable words are extremely common in modern Chinese. Moreover, using multi-syllable word elements can help more accurately express certain aspects of the language, such as soft tones and "r" endings.

Treatment of Words with Soft Tone Endings

In modern Chinese, most characters are pronounced with one of four tones, but some characters, when they form the final syllable of multi-syllable word, are pronounced in a soft tone. For example, the MSW element for the word house:

TABLE 4

| RHE MSW element | Simplified Chinese character | Traditional Chinese character | Concatenated tones and marks |
|---|---|---|---|
| fang2zi0001 | 房子 | 房子 | 20053001 |

In the MSW element for this example, the Syllable+Tone pair "zi0" indicates that the second syllable is a soft tone, while in the numeric string of the fourth column, the second half, "3001", indicates that the second syllable for "子", when pronounced as an individual Chinese character, originally has the third tone 3; the soft tone 0 for "子" in "房子" is just a necessary tone variant. RHE therefore provides the ability to explicitly express soft tones in Chinese language.

Treatment of Words with "r" Endings

In colloquial Chinese spoken language, a non-syllabic "r" sound (transcribed in IPA as [ɚ]) is sometimes suffixed to certain syllables to form a combined sound. This "r" sound may be represented in the written language by adding the character "儿" (pronounced "er" as a stand-alone character) at the end of the original word. However, the pronunciation of the character "儿" as a stand-alone character is slightly different from the "r" sound in the r-suffixation. There is no explicit way in conventional Chinese language processing systems to indicate which of these two ways the character "儿" should sound.

In RHE processing, the character "儿" as r-suffixation is not included in the SSW and MSW tables. Rather, RHE employs a special Tone value for the word that is being r-suffixed, namely, derived by adding a value 5 to its original Tone value (so the Tone value becomes 5 to 9), to indicate that its pronunciation should include the r-suffix. When the RHE system processes the SSW or MSW elements for display, if a Tone value of 5 or greater is encountered, the value is reduced by 5 to give its original tone, and the resulting character is displayed with an r-suffix accordingly—e.g., if the display is to be in simplified or traditional characters, by appending the character "儿", and if the display is to be in Pinyin, by adding the letter "r". For example, in the following example in Table 5,

TABLE 5

| RHE MSW elements | Simplified Chinese character | Traditional Chinese character | Concatenated tones and marks |
|---|---|---|---|
| men2dun1001 | 门墩 | 門墩 | 20011004 |

The MSW element men2dun 1001 represents the MSW without an r-suffix. When it is to be an r-suffix word, the RHE MSW element is changed to men2dun6001. Then when the word is processed by the RHE system, the second tone value 6 is converted back to 6−5=1, the displayed simplified and traditional characters are modified to "门墩儿" and "門墩儿", respectively, and the Pinyin display is modified to méndūnr. This method may be applied to both single syllable and multi-syllable words. RHE therefore provides the ability to explicitly express r-suffix for Chinese language.

Example 2—Text Stored Using SSW and MSW Elements

Using the SSW and MSW storage format, the following example is for the sentences meaning "China's capital is Beijing. Beijing has many parks full of fresh flowers, many fun places to visit, and is a popular tourist destination." In modern Chinese:
SSWs and MSWs in the RHE format:
zhong1guo2007 de0002 shou3du 1001 shi4019 bei3jing 1003. bei3jing 1003 you3002 xu3duo 1001 kai1001 man3001 xian1hua6001 de0002 gong 1yuan2002, you3002 xu3duo 1001 hao3wan7001 de0002 di4fang0001, shi4ge4001 lv3you2001 sheng4di4002.
Display in simplified Chinese characters:

中国的首都是北京．北京有许多开满鲜花儿的公园，有许多好玩儿的地方，是个旅游胜地．

Display in traditional Chinese characters:

中國的首都是北京．北京有許多開滿鮮花儿的公園，有許多好玩儿的地方，是個旅游勝地．

Display in Hanyu Pinyin:
zhōngguó de shǒudū shì běijīng. běijīng yǒu xǔduō kāi mǎn xiānhuār de gōngyuán, yǒu xǔduō hǎowánr de dìfang, shìgè lyóu shèngdì.
Display in Pinyin+Mark:
zhōngguó[7] de[2] shǒudū[1] shì[19] běijīng[3]. běijīng[3] yǒu[2] xǔduō[1] kāi[1] mǎn[1] xiānhuā[1]r de[2] gōngyuán[2], yǒu[2] xǔduō[1] hǎowánr[1] de[2] dìfang[1], shìgè[1] lyóu[1] shèngdì[2].

Figure 1A:
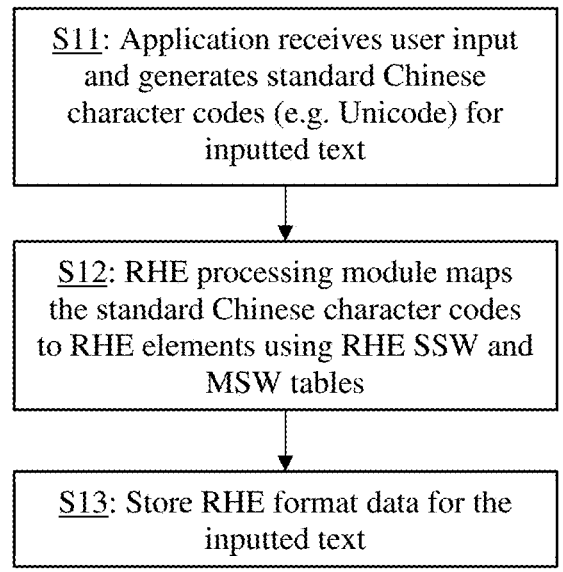
FIGS. 1A and 1B are flow charts illustrating a Chinese language processing method according to embodiments of the present invention.
Figure 1B:
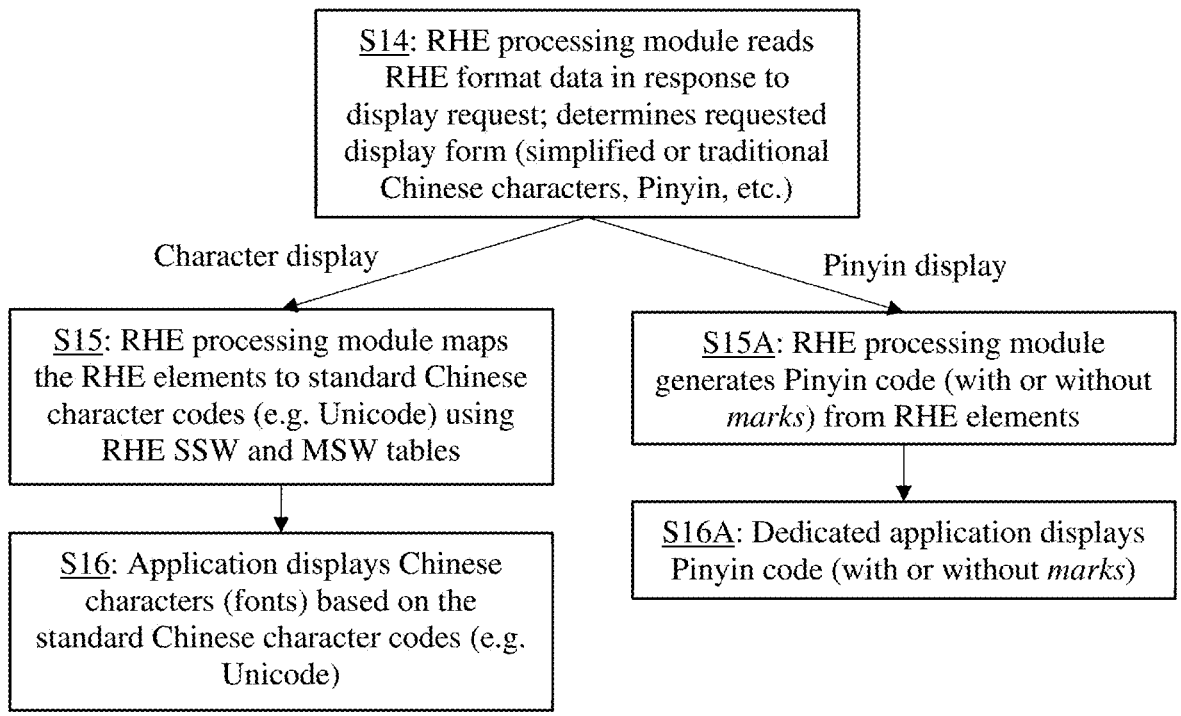
Figure 5A:
FIGS. 5A-5E and 6A-6E are examples of displayed Chinese language in different forms produced by the Chinese language storage and processing system.
Figure 5B:
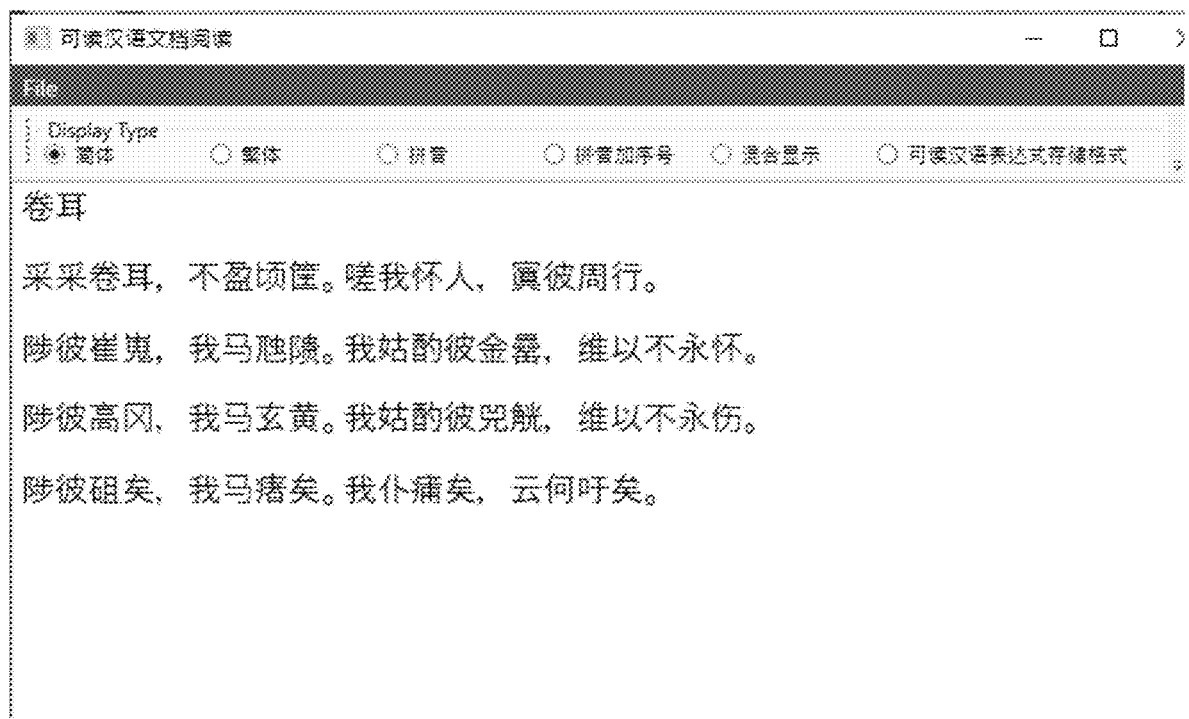
Figure 5C:
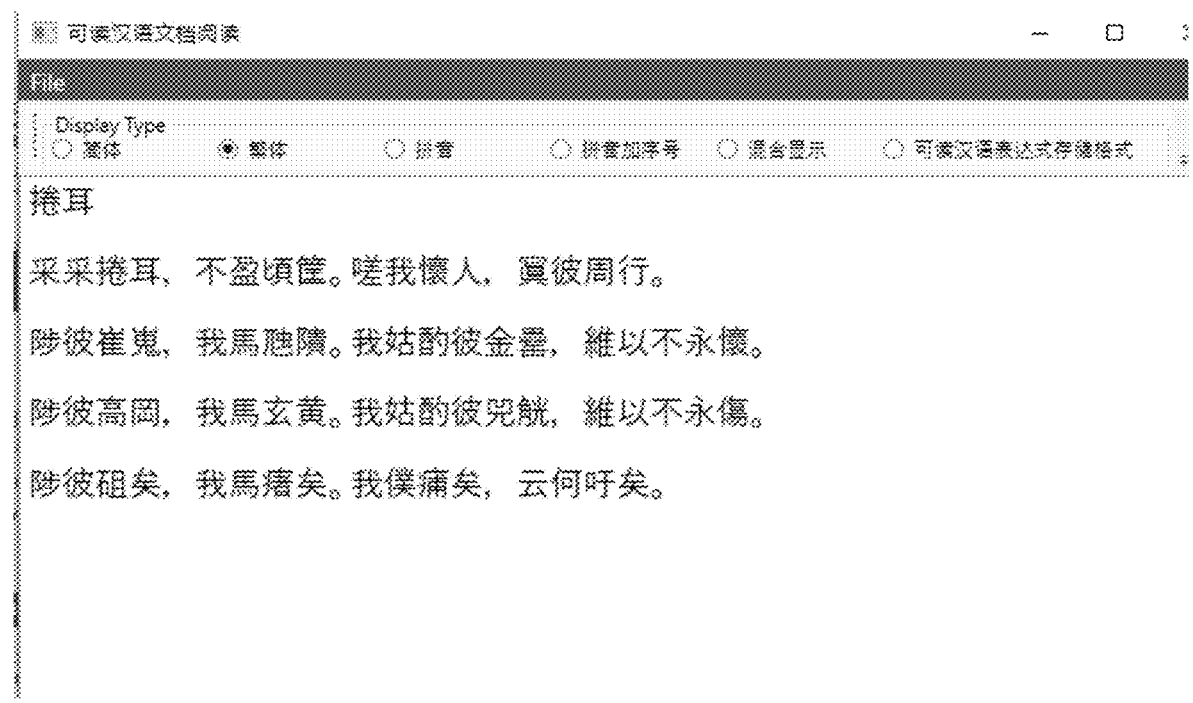
Figure 5D:
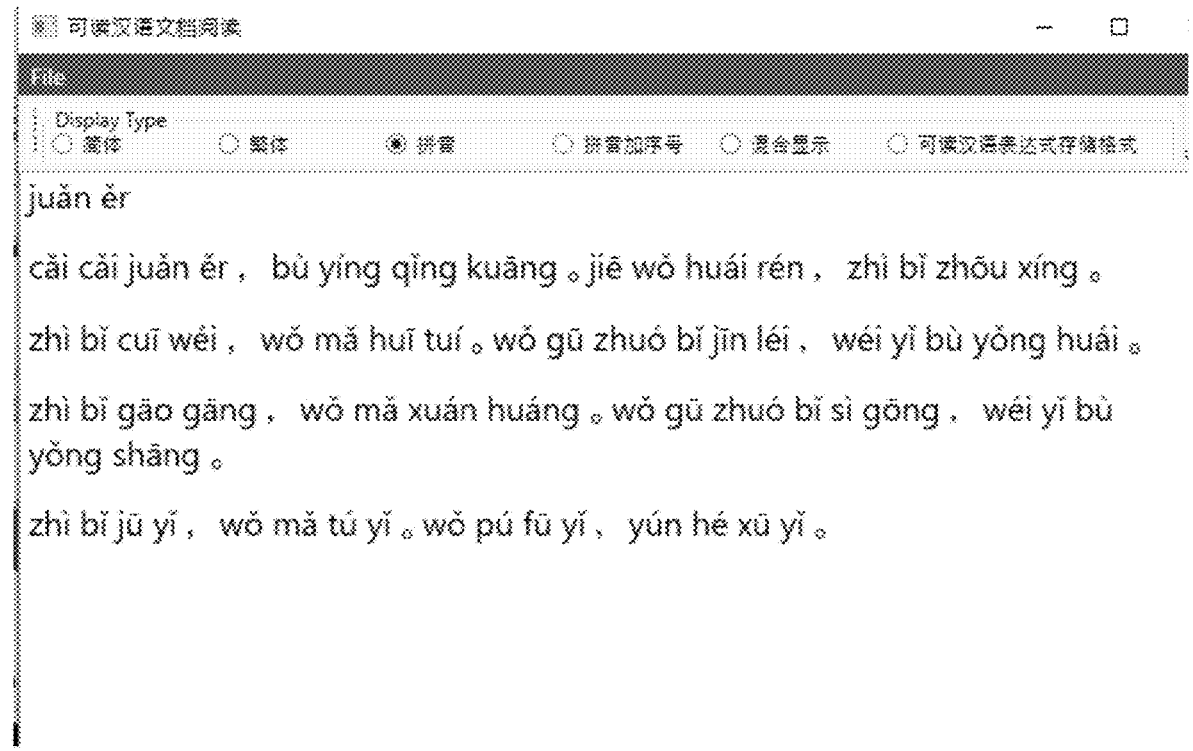
Figure 5E:
Figure 6A:
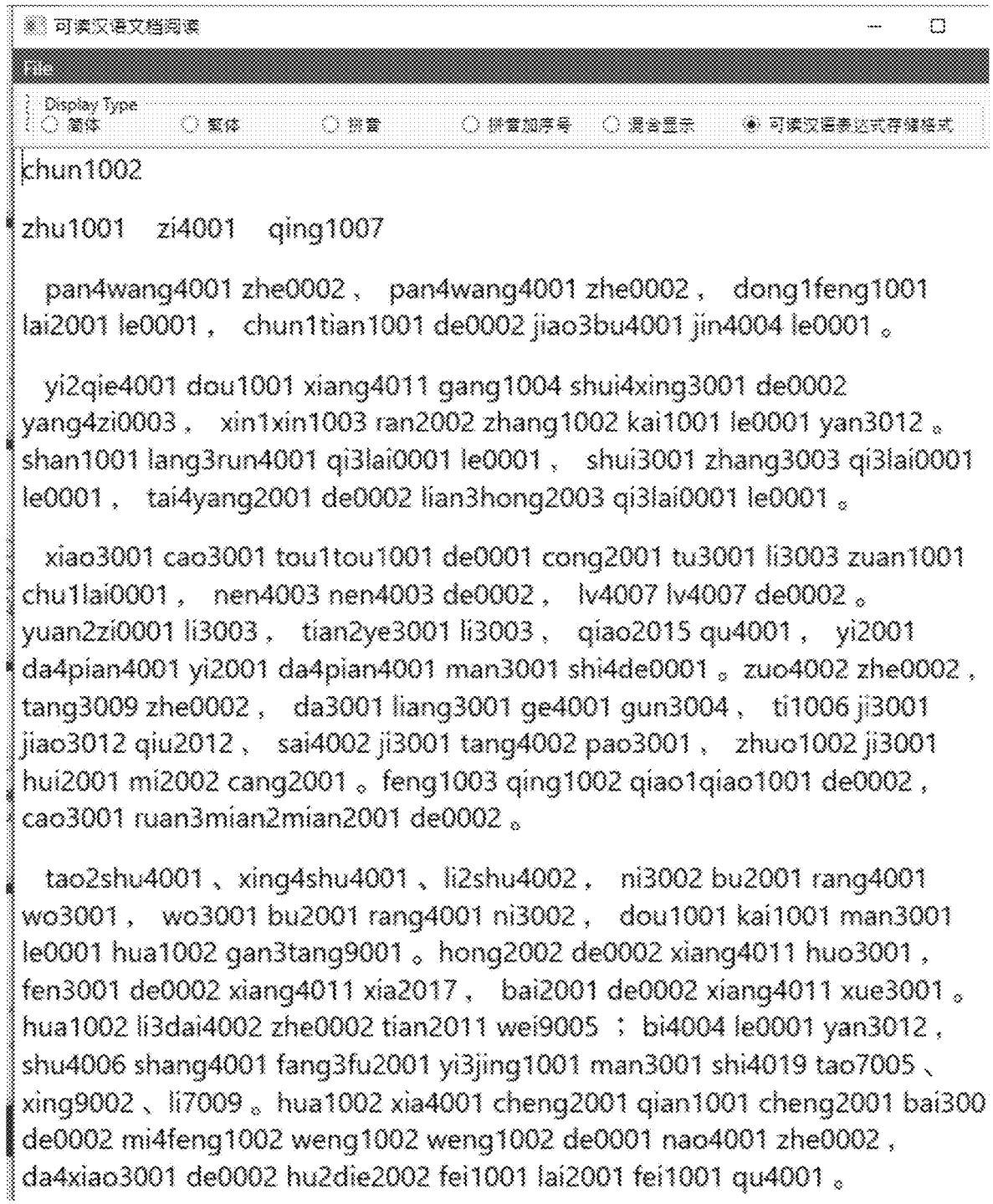
Figure 6B:
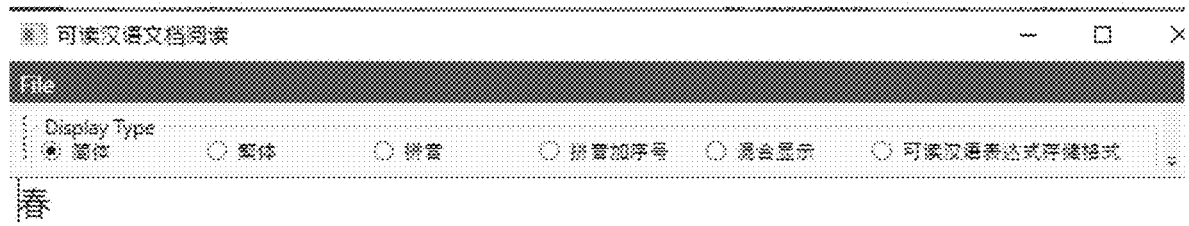
Figure 6C:
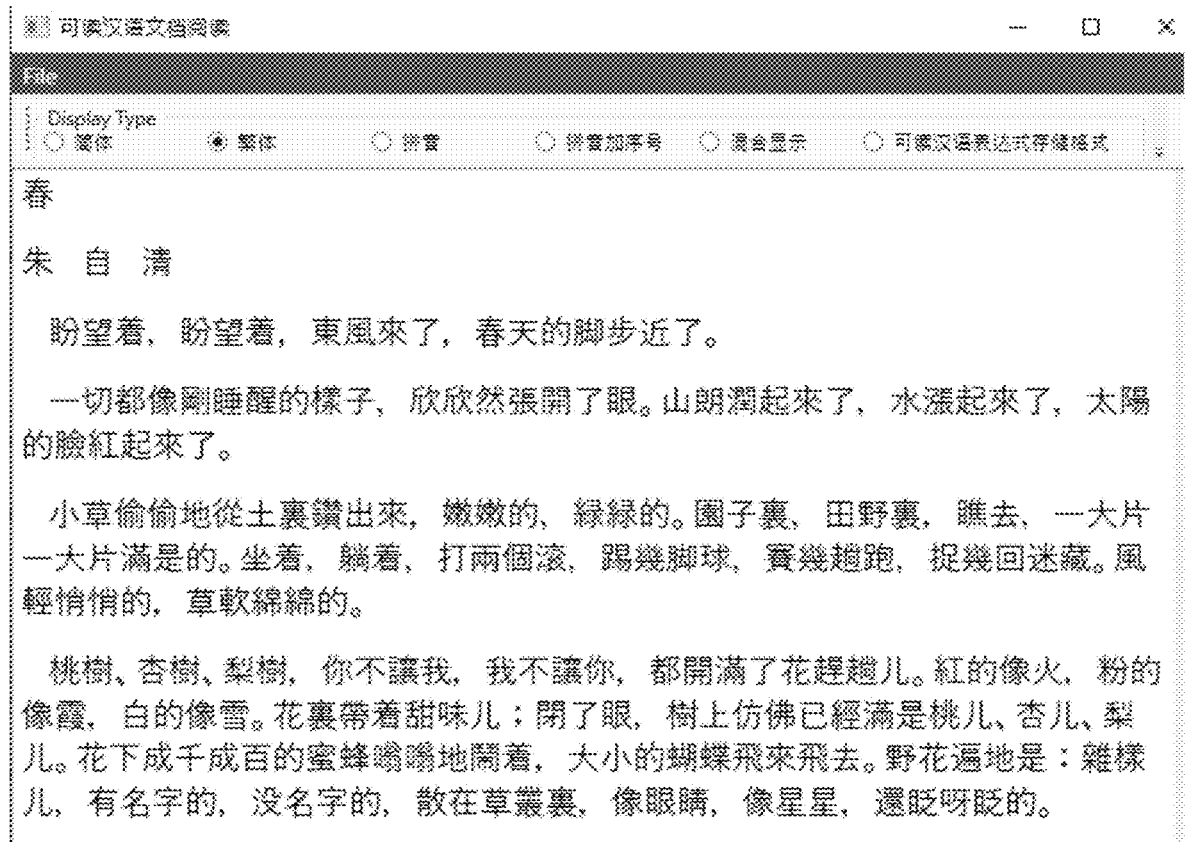
Figure 6D:
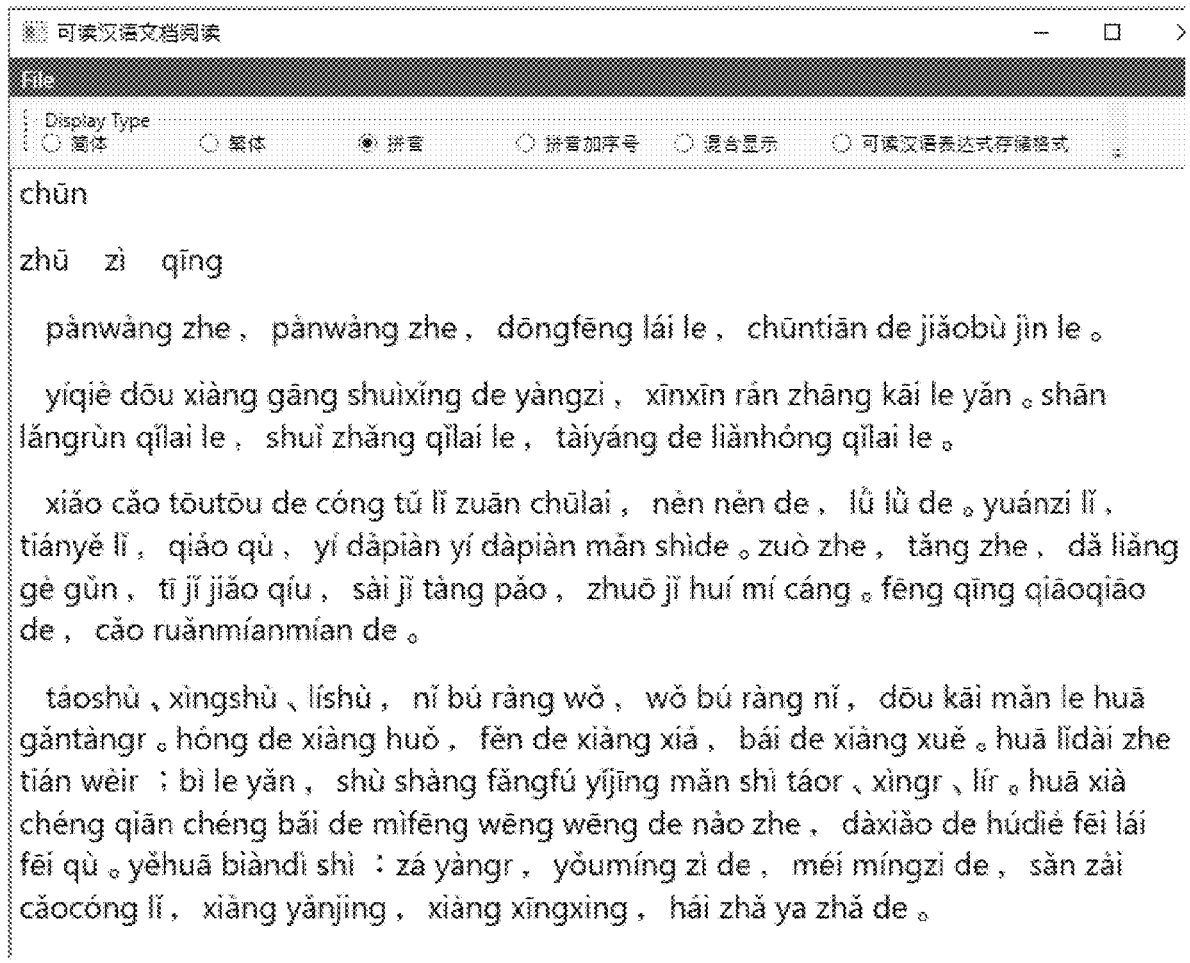
Figure 6E:

From the above descriptions, it can be seen that the RHE storage format is inherently readable because it uses Pinyin to represent the syllables, unlike conventional character coding schemes such as Unicode, GB, BIG5, etc.
RHE Storage and Display Process Flow Referring back to FIG. 1 now, and with reference to the flowchart in FIGS. 1A and 1B, the overall RHE storage and display process flows are as follows.

When the user uses the external application 40 to input Chinese characters, the application generates standard character codes for the characters as defined by a conventional standard Chinese character coding system such as Unicode, GB, BIG5, etc. (step S11). The input method is a part of the functionality of the application 40 or the operating system, not the RHE processing module 10. Based on the received standard character codes, the RHE processing module 10 generates the RHE elements for the single or multi-syllable words by mapping the characters to RHE elements using the SSW and MSW tables (step S12). More specifically, the processing module 10 may first use the MSW table to determine whether the input data contains character combinations that are in the MSW table, and generates RHE MSW elements accordingly; for characters that are not a part of such character combinations, it generates RHE SSW elements using the SSW table.

The RHE format data for the text is stored in the computer system (step S13). In other words, the RHE format data is the stored form of the Chinese language. When the text is to be displayed, the stored RHE format data is read out (step S14), and mapped to the standard character codes (e.g., Unicode, GB, BIG5, etc.) using the SSW or MSW table (step S15). Depending on the requested display form, standard character codes for simplified or traditional Chinese characters may be generated. The standard character codes are output to the application 40 (same as or different from the application that inputted the text) (step S16), which displays the characters (fonts) (step S17). The display method is a part of the functionality of the application 40 or the operating system, not the RHE processing module.

In the above process flow, the RHE processing module is transparent to the application 40, which may be any application that is able to interact with the standard Chinese character code. In an alternative process flow, the application that requested the display (an RHE text viewer application) is specifically designed to work with the RHE processing module, and can display not only simplified and traditional Chinese characters based on the standard character code (e.g. Unicode), but also special display forms that the RHE processing module can generate, such as the RHE form itself, Pinyin form, Pinyin with Mark form, mixed or combined display form, etc. The Pinyin form displays the text in Pinyin codes (using diacritics for tones), which may be readily obtained using the Syllable with Tone table. The Pinyin with Mark form is similar to the Pinyin form but with the Mark values of the RHE element (SSW or MSW) also displayed, for example as a superscript or subscript. A mixed or combined display form may display two or more forms simultaneously, e.g., the simplified character form and the Pinyin form, which may be useful in language learning, for example. Using this RHE text viewer application, the user may easily switch among the different display forms when viewing a Chinese language document.

To summarize, the RHE processing module is able to generate output data based on the stored RHE format data, where the output data is in a form selected from the following: the RHE format, simplified Chinese characters (encoded in a standard Chinese character code), traditional Chinese characters (encoded in a standard Chinese character code), Pinyin, and Pinyin with Mark, or a combination of thereof. The RHE text viewer application is able to interact with the RHE processing module to display the output data in these forms, and allows the user to select the forms to be displayed. FIGS. 5A-5E and 6A-6E are examples of Chinese text in various display forms generated by an RHE text viewer application. FIGS. 5A-5E show a text, an ancient poem, displayed in these five different forms, respectively. In this example, the text is stored using only RHE single-syllable word elements. FIGS. 6A-6E show another text, a modern prose, displayed in the above five different forms, respectively. In this example, the text is stored using both RHE single-syllable word elements and multi-syllable word elements.

To summarize, the RHE format storage and the associated processing method according to embodiments of the present invention has many advantages. It makes Chinese text readable, because the RHE elements are composed of syllables and tones. Individual Chinese characters that have multiple pronunciations are mapped to multiple different RHE elements, eliminating any confusion. It enables display of the Chinese language in different display forms, including simplified characters, traditional characters, Pinyin, Pinyin with Mark, etc. It is able to accurately represent certain special pronunciations including soft tone and r-suffixation, enabling such words to be stored and displayed correctly. It is able to easily switch the display between simplified characters and traditional characters, as the two versions are mapped to the same RHE elements.

In FIG. 1, the computer system may be any suitable computing device or devices such as a mobile phone, tablet computer, laptop computer, server, etc., or a combination of the above, including server-client systems and cloud computing systems. These devices or system have hardware and software components familiar to those of ordinary skill in the art, including one or more processors with memory and one or more storage devices (not shown in FIG. 1). The applications 40 and the Chinese character coding database 30 may be located on the same computer as the RHE processing layer 10 and 20, or on different computers which communicate with each other by wired or wireless communication methods.

In one aspect, the invention is a method carried out by a data processing system. In another aspect, the invention is computer program product embodied in computer usable non-transitory medium having a computer readable program code embedded therein for controlling a data processing apparatus to carry out the method. In another aspect, the invention is embodied in a data processing system.

It will be apparent to those skilled in the art that various modification and variations can be made in the RHE Chinese language storage format and related processing method and apparatus of the present invention without departing from the spirit or scope of the invention. Thus, it is intended that the present invention cover modifications and variations that come within the scope of the appended claims and their equivalents.

The invention claimed is:

1. A method implemented in a computer system for processing Chinese language, the method comprising:
receiving an input Chinese language text including a plurality of Chinese words;
generating a plurality of storage elements by mapping each of the plurality of words into a storage element, wherein the storage element for each word includes a first part, Syllable, which represents a pronunciation of a syllable of the word without a tone, a second part, Tone, which represents a tone of the pronunciation of the syllable, and a third part, Mark, which uniquely identifies the word among multiple words of identical pronunciations and tones; and
storing the storage elements in the computer system,
wherein the storage element for each word is an alphanumeric string formed of ASCII symbols, wherein the Syllable is formed of letters of English alphabet, the Tone is a single digit numerical value, and the Mark is a three-digit numerical value,
wherein the Syllable of each storage element is a Hanyu Pinyin without tone representation of the pronunciation of the corresponding syllable,
wherein either the Tone is 0, 1, 2, 3 or 4 which represents a soft tone, a first tone, a second tone, a third tone or a fourth tone, respectively,
or the Tone is 0, 1, 2, 3 or 4 which represents a soft tone, a first tone, a second tone, a third tone or a fourth tone, respectively, or 5, 6, 7, 8, or 9 which represents a variant of the soft tone, the first tone, the second tone, the third tone or the fourth tone, respectively.

2. The method of claim 1, further comprising storing in the computer system a first mapping table maps a plurality of Syllable and Tone combinations to a corresponding plurality of Hanyu Pinyin with tone representations.

3. The method of claim 2, wherein some of the plurality of storage elements generated in the step of generating the plurality of storage elements are single-syllable word (SSW) storage elements each mapped from a single-syllable Chinese word in the input Chinese language text, each SSW storage element including only one Syllable, only one Tone, and only one Mark, in a format:
Syllable+Tone+Mark.

4. The method of claim 3, further comprising storing a second mapping table which maps each of a plurality of SSW storage elements to one or two Chinese characters encoded in standard Chinese character codes.

5. The method of claim 4, wherein the second mapping table maps each of the plurality of SSW storage elements to one simplified Chinese character and one traditional Chinese character, each Chinese character being encoded in a standard Chinese character code.

6. The method of claim 4, wherein the input Chinese language text is encoded in the standard Chinese character codes, and wherein the step of generating the plurality of storage elements by mapping each of the plurality of words into the storage element includes mapping a plurality of standard Chinese character codes in the input Chinese language text to the plurality of SSW storage elements using the second mapping table.

7. The method of claim 6, further comprising:
receiving a stored Chinese language text which includes a plurality of SSW storage elements; and
generating output data for display by mapping each of the plurality of SSW storage elements in the stored Chinese language text to a standard Chinese character code using the second mapping table.

8. The method of claim 6, further comprising:
receiving a Chinese language text which includes a plurality of SSW storage elements, and a selection of an output form; and
generating output data based on the selected output form, wherein the output data is either a form of the storage elements, or simplified Chinese characters, or traditional Chinese characters, or Hanyu Pinyin, or Hanyu Pinyin with Tone, wherein the output data is generated by mapping the plurality of SSW storage elements to the output data using the first and second mapping tables.

9. The method of claim 6, wherein some of the plurality of storage elements generated in the generating step are multi-syllable word (MSW) storage elements each mapped from a multi-syllable Chinese word in the input Chinese language text, each MSW storage element including two or more Syllable and Tone pairs and only one Mark, in a format:
$Syllable_1+Tone_1+Syllable_2+Tone_2+ \ldots +Syllable_n+Tone_n+Mark$
where $n \geq 2$ is a number of syllables in the multi-syllable word, and each Syllable and Tone pair represents a pronunciation without tone and a tone of a corresponding syllable of the multi-syllable word.

10. The method of claim 9, further comprising storing in the computer system a third mapping table which maps each of a plurality of MSW storage elements to one or two sets of Chinese characters encoded in standard Chinese character codes.

11. The method of claim 10, wherein the third mapping table maps each of the plurality of MSW storage elements to one set of simplified Chinese characters and one set of traditional Chinese characters, each one of the Chinese characters being encoded in a standard Chinese character code.

12. The method of claim 10, wherein in some of the MSW storage elements in the third mapping table, the Tone$_n$ of their final syllables are a soft tone, and wherein the SSW storage elements in the second mapping table that correspond to the final syllables have a first, second, third or fourth tone.

13. The method of claim 10, wherein some of the SSW and MSW storage elements in the second and third mapping tables include Tones which are variant tone values derived by adding a fixed value to their original tone values to represent r-suffixation.

14. The method of claim 10, wherein the input Chinese language text is encoded in the standard Chinese character codes, and wherein the step of generating a plurality of storage elements by mapping each of the plurality of words into a storage element further includes mapping a plurality of standard Chinese character codes in the input Chinese language text to the plurality of MSW storage elements using the third mapping table.

15. The method of claim 14, further comprising:
receiving a stored Chinese language text which includes a plurality of SSW storage elements and a plurality of MSW storage elements; and
generating output data for display by mapping each of the plurality of SSW storage elements in the stored Chinese language text to a standard Chinese character code using the second mapping table, and mapping each of the plurality of MSW storage elements in the stored Chinese language text to a set of standard Chinese character codes using the third mapping table.

16. The method of claim 14, further comprising:
receiving a Chinese language text which includes a plurality of SSW storage elements and a plurality of MSW storage elements, and a selection of an output form; and
generating output data based on the selected output form, wherein the output data is either a form of the storage elements, or simplified Chinese characters, or traditional Chinese characters, or Hanyu Pinyin, or Hanyu Pinyin with Tone, wherein the output data is generated by mapping the plurality of SSW storage elements and a plurality of MSW storage elements to the output data using the first, second and third mapping tables.

17. A computer program product comprising a non-transitory computer readable storage medium having a computer readable program code embedded therein for controlling a computer system, the computer readable program code configured to cause the computer system to execute a process for processing Chinese language for storage, the process comprising:
receiving an input Chinese language text including a plurality of Chinese words;
generating a plurality of storage elements by mapping each of the plurality of words into a storage element, wherein the storage element for each word includes a first part, Syllable, which represents a pronunciation of a syllable of the word without a tone, a second part, Tone, which represents a tone of the pronunciation of the syllable, and a third part, Mark, which uniquely identifies the word among multiple words of identical pronunciations and tones; and
storing the storage elements in the computer system,
wherein the storage element for each word is an alphanumeric string formed of ASCII symbols, wherein the Syllable is formed of letters of English alphabet, the Tone is a single digit numerical value, and the Mark is a three-digit numerical value,
wherein the Syllable of each storage element is a Hanyu Pinyin without tone representation of the Pronunciation of the corresponding syllable,
wherein either the Tone is 0, 1, 2, 3 or 4 which represents a soft tone, a first tone, a second tone, a third tone or a fourth tone, respectively,
or the Tone is 0, 1, 2, 3 or 4 which represents a soft tone, a first tone, a second tone, a third tone or a fourth tone, respectively, or 5, 6, 7, 8, or 9 which represents a variant of the soft tone, the first tone, the second tone, the third tone or the fourth tone, respectively.

18. The computer program product of claim 17, the process further comprising storing in the computer system a first mapping table maps a plurality of Syllable and Tone combinations to a corresponding plurality of Hanyu Pinyin with tone representations.

19. The computer program product of claim 18, wherein some of the plurality of storage elements generated in the step of generating the plurality of storage elements are single-syllable word (SSW) storage elements each mapped from a single-syllable Chinese word in the input Chinese language text, each SSW storage element including only one Syllable, only one Tone, and only one Mark, in a format: Syllable+Tone+Mark.

20. The computer program product of claim 19, the process further comprising storing a second mapping table which maps each of a plurality of SSW storage elements to one or two Chinese characters encoded in standard Chinese character codes.

21. The computer program product of claim 20, wherein the second mapping table maps each of the plurality of SSW storage elements to one simplified Chinese character and one traditional Chinese character, each Chinese character being encoded in a standard Chinese character code.

22. The computer program product of claim 20, wherein the input Chinese language text is encoded in the standard Chinese character codes, and wherein the step of generating the plurality of storage elements by mapping each of the plurality of words into the storage element includes mapping a plurality of standard Chinese character codes in the input Chinese language text to the plurality of SSW storage elements using the second mapping table.

23. The computer program product of claim 22, the process further comprising:
receiving a stored Chinese language text which includes a plurality of SSW storage elements; and
generating output data for display by mapping each of the plurality of SSW storage elements in the stored Chinese language text to a standard Chinese character code using the second mapping table.

24. The computer program product of claim 22, the process further comprising:
receiving a Chinese language text which includes a plurality of SSW storage elements, and a selection of an output form; and
generating output data based on the selected output form, wherein the output data is either a form of the storage elements, or simplified Chinese characters, or traditional Chinese characters, or Hanyu Pinyin, or Hanyu Pinyin with Tone, wherein the output data is generated by mapping the plurality of SSW storage elements to the output data using the first and second mapping tables.

25. The computer program product of claim 22, wherein some of the plurality of storage elements generated in the generating step are multi-syllable word (MSW) storage elements each mapped from a multi-syllable Chinese word in the input Chinese language text, each MSW storage element including two or more Syllable and Tone pairs and only one Mark, in a format:

$Syllable_1+Tone_1+Syllable_2+Tone_2+ \ldots +Syllable_n+Tone_n+Mark$ where n≥2 is a number of syllables in the multi-syllable word, and each Syllable and Tone pair represents a pronunciation without tone and a tone of a corresponding syllable of the multi-syllable word.

26. The computer program product of claim 25, the process further comprising storing in the computer system a third mapping table which maps each of a plurality of MSW storage elements to one or two sets of Chinese characters encoded in standard Chinese character codes.

27. The computer program product of claim 26, wherein the third mapping table maps each of the plurality of MSW storage elements to one set of simplified Chinese characters and one set of traditional Chinese characters, each one of the Chinese characters being encoded in a standard Chinese character code.

28. The computer program product of claim 26, wherein in some of the MSW storage elements in the third mapping table, the $Tone_n$ of their final syllables are a soft tone, and wherein the SSW storage elements in the second mapping table that correspond to the final syllables have a first, second, third or fourth tone.

29. The computer program product of claim 26, wherein some of the SSW and MSW storage elements in the second and third mapping tables include Tones which are variant tone values derived by adding a fixed value to their original tone values to represent r-suffixation.

30. The computer program product of claim 26, wherein the input Chinese language text is encoded in the standard Chinese character codes, and wherein the step of generating a plurality of storage elements by mapping each of the plurality of words into a storage element further includes mapping a plurality of standard Chinese character codes in the input Chinese language text to the plurality of MSW storage elements using the third mapping table.

31. The computer program product of claim 30, the process further comprising:

receiving a stored Chinese language text which includes a plurality of SSW storage elements and a plurality of MSW storage elements; and generating output data for display by mapping each of the plurality of SSW storage elements in the stored Chinese language text to a standard Chinese character code using the second mapping table, and mapping each of the plurality of MSW storage elements in the stored Chinese language text to a set of standard Chinese character codes using the third mapping table.

32. The computer program product of claim 30, the process further comprising:

receiving a Chinese language text which includes a plurality of SSW storage elements and a plurality of MSW storage elements, and a selection of an output form; and generating output data based on the selected output form, wherein the output data is either a form of the storage elements, or simplified Chinese characters, or traditional Chinese characters, or Hanyu Pinyin, or Hanyu Pinyin with Tone, wherein the output data is generated by mapping the plurality of SSW storage elements and a plurality of MSW storage elements to the output data using the first, second and third mapping tables.

\* \* \* \* \*